United States Patent Office 2,977,334
Patented Mar. 28, 1961

2,977,334

DERIVATIVES OF ETHYLENE/MALEIC ANHYDRIDE COPOLYMERS

George W. Zopf, Jr., John H. Johnson, Ross M. Hedrick, Joseph E. Fields, and John M. Butler, Dayton, Ohio, assignors to Monsanto Chemical Company, St. Louis, Mo., a corporation of Delaware No Drawing. Filed Oct. 4, 1956, Ser. No. 613,829

18 Claims. (Cl. 260—27)

This invention relates to derivatives of copolymers of ethylene and maleic anhydride. The invention also relates to compositions containing, processes for preparing, and methods of utilizing such derivatives.

Some copolymers of ethylene and maleic anhydride and the methods for preparation thereof are known. (See, for example, Hanford—U.S. 2,378,629.) These copolymers have been hydrolyzed to form alkali metal or ammonium salts. (See, for example, Spanagel—U.S. 2,289,222.) A few simple esters and amides of the ethylene/maleic anhydride copolymers have been prepared and used as lubricating oil additives. (See, for example, U.S. 2,615,845.) Aside from the foregoing references and a few others of a similar nature, there was very little known about the reactions and derivatives of copolymers of ethylene/maleic anhydride prior to the present invention.

It has now been found that ethylene/maleic anhydride copolymers can be used as a basis for a large variety of extremely valuable polymeric materials of the types described in more detail below. These polymers are very useful for one or more of the following purposes: coating resins; synthetic varnish or drying oils; additives (e.g., gelling agents, thickeners, pour point modifiers, viscosity index improvers, etc.) for mineral and synthetic oils (including so-called functional fluids as well as lubricating oils); paper and textile sizing agents; laminating, casting and potting resins; adhesive agents; water-proofing agents; film-forming polymers; plasticizers (especially for polymeric materials such as polyvinyl chloride); and/or as intermediates for the formation of other polymeric compositions which are useful for one or more of the foregoing applications.

The first step in the preparation of the novel polymeric materials of the present invention is the preparation of the copolymer of ethylene and maleic anhydride. This can be carried out according to any of the known prior art procedures. Ethylene and maleic anhydride copolymerize only in substantially equimolar proportions, regardless of attempts to react large proportions of one or the other of the comonomers. This indicates that the structure of the copolymer is one of substantially uniform alternation of ethylene and maleic anhydride units to form a polymeric substance having a structure of the following type:

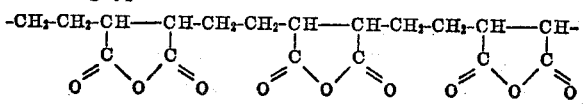

or

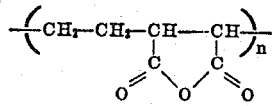

wherein $n$ is a positive integer. It is believed that the foregoing uniform structure of the so-called "backbone" of the polymeric materials of this invention is to a large extent responsible for many of the outstanding and unique properties of the materials.

After the formation of the copolymers of ethylene and maleic anhydride, the next step involves the formation of a partial (e.g., half) ester or amide of the aforesaid ethylene/maleic anhydride copolymer. The half esters are formed by reactions with alcohols; the half amides are formed by reactions with primary or secondary amines. The half esters are ideally prepared by heating together stoichiometric amounts of alcohol and anhydride polymer. Such a method may be employed directly when (1) the volume of the alcohol is such that a fluid slurry is formed, and (2) the boiling point of the alcohol is higher than the temperature at which the half ester is sufficiently fluid to be stirred and poured.

If the half ester is soluble in an inert solvent, the above procedure may be modified by addition of solvent to promote fluidity. Such a modified process permits the use of lower molecular weight alcohols which alone would not be sufficiently bulky to maintain a fluid reaction mixture.

In cases where a low-molecular weight alcohol is used, or where the alcohol volume is insufficient for fluidity and the half ester to be formed is insoluble in an inert solvent, an excess of alcohol sufficient to maintain fluidity is used. In such a case, if the alcohol boils substantially above the boiling point of water, it is important that heating be discontinued when clear solution is effected. If heating is continued, esterification may proceed beyond the half ester by elimination of water.

For alcohols boiling near or below the boiling point of water, the excess alcohol process may be used without fear of going beyond half-esterification.

An alternate method for preparing esters from alcohols boiling below the boiling point of water is to charge stoichiometric amounts of alcohol and anhydride polymer to a pressure vessel and heat at a temperature above the boiling point of the alcohol until the initial damp powder is converted to clear homogeneous half ester.

Wherever practical, it is preferred to use a method employing stoichiometric amounts of reactants without solvent, thus avoiding the tedious and expensive steps of precipitation, washing, and drying, with concomitant loss of product.

The use of strongly acidic catalysts such as the strong mineral acids, aromatic sulfonic acids, etc., promotes rapid half-esterification.

The half amides can be prepared by reaction of stoichiometric amounts of amine and anhydride polymer, with or without accessory solvents for either or both of the initial reactants and/or for the final half amide.

Thus, the anhydride polymer and the amine may be dissolved separately in a solvent for both that is not a solvent for the half amide. Mixing of the two solutions then gives a precipitate of the half amide, which may be separated, washed, and dried.

The amine may be dissolved in a solvent that will not dissolve the anhydride polymer, and reaction effected by standing or heating. If the half amide formed is soluble in the solvent used for the amine, the endpoint of the reaction is evidenced by formation of a clear solution.

In the preparation of half amides, it is preferred that a relatively brief period of heating be used after the amine and anhydride polymer are mixed together to insure complete reaction. If this heating is at too high a temperature, or done in the presence of a refluxing solvent that forms an azeotrope with water, the half amide units are converted to imides by elimination of water.

It will be apparent from the ensuing disclosure that the present polymeric materials can contain (1) ester groups (without amide groups), (2) amide groups (without ester groups) or (3) both ester and amide groups in the same polymer molecule. In the interests of simplicity, these three types of polymers will be referred to collectively as "estamides" throughout the remainder of this specification. Thus, the term "estamide" encompasses esters, amides and mixed ester-amides.

Instead of direct reaction between the alcohols or amines and the anhydride polymer as described above, the anhydride polymer can first be hydrolyzed to give a polycarboxylic acid—which is then reacted with either the alcohol or the amine to form the corresponding estamide. However, the presence of anhydride rings in the polymers presents advantages not shared by carboxyl polymers in general. This is immediately apparent if one attempts comparative half-esterifications of an anhydride polymer and its hydrolyzed derivative, using a low boiling alcohol such as ethanol in considerable excess. After a relatively short period of heating at reflux, the anhydride polymer goes into solution, as the half-ester is formed. The hydrolyzed polymer goes immediately in solution, but after an equivalent period of reflux, the polymer is found to be esterified only slightly, if at all. This difference of behavior hinges on the fact that the half-ester can be formed from the anhydride polymer without elimination of water, while one molecule of water must be eliminated from the hydrolyzed polymer for every ester group formed.

With higher boiling alcohols, this difference in behavior is less pronounced, since since the hydrolyzed polymer readily loses water to reform the anhydride. However, this dehydration would proceed simultaneously with esterification and means would have to be provided for the removal of the water thus formed.

Another difference to be expected from anhydride polymers is the relative orderliness of the derivatives prepared therefrom. The process of half-esterification of an anhydride unit insures that one and only one of each pair of carboxyls forming the anhydride unit becomes esterified, since diesterification would require removal of water. Thus, the half-estamide prepared from the ethylene/maleic anhydride copolymers is substantially free of adjacent (i.e., attached to adjacent carbon atoms) unreacted carboxyl groups as well as being substantially free of adjacent amide and/or ester groups. For hydrolyzed polymer, or for carboxylic acid polymers in general, esterification is more random, with a large probability that diesterified, half-esterified, and non-esterified groups occur simultaneously and at random along the chain.

It should be recognized that partial estamides other than the half estamides can be formed by reacting either (1) less than one mole of alcohol and/or amine per mole of anhydride in the ethylene/maleic anhydride copolymer or (2) more than one but less than two moles of alcohol and/or amine per mole of maleic anhydride in the ethylene/maleic anhydride copolymer. In the first case (which will be referred to hereinafter as a "partial half estamide") the distribution of the ester and/or amide groups along the ethylene/maleic anhydride backbone will still be uniform to the extent that the copolymer will be substantially free of adjacent ester and/or amide groups. In such a case, however, there will be unreacted anhydride groups left in the polymer. In the second case (referred to hereinafter as a "partial diestamide"), the ester and/or amide groups will be uniformly distributed along the ethylene/maleic anhydride backbone to the extent that there will be no unreacted anyhdride groups remaining in the copolymer. As will be more readily apparent from the detailed disclosure which appears hereinafter, both the partial half estamides and the partial diestamides are of considerable importance, especially when it is desired to form a polymeric material containing more than two different types of ester and/or amide groups in the same polymer molecule, or to form a polymeric material having unequal proportions of two different ester and/or amide groups in the same polymer molecule.

Alcohols and amines which are useful in preparing the estamides of this invention are any selected from one or more of the various general categories outlined below. Representative species of each general category are set forth to illustrate but not limit the general category.

TABLE I (A) Simple alcohols (i.e., without polar substitutions)
   (1) Alkyl alcohols (normal or branched; primary, secondary or tertiary)
      (a) Short chain alkyl ($C_1$ to $C_7$)
         methyl alcohol
         ethyl alcohol
         n-propyl alcohol
         i-propyl alcohol
         n-butyl alcohol
         i-butyl alcohol
         sec.-butyl alcohol
         tert.-butyl alcohol
         n-amyl alcohol
         sec.-n-amyl alcohol
         sec.-i-amyl alcohol
         1,2-dimethylpropyl alcohol
         tert.-amyl alcohol
         n-hexyl alcohol
         3-methylpentyl alcohol
         1,3-dimethylbutyl alcohol
         2,4-dimethylbutyl alcohol
         n-heptyl alcohol
         2,4-dimethylpentyl alcohol
         3,5-dimethylpentyl alcohol
         oxo alcohol of propylene dimer
      (b) Long chain alkyl ($C_8$ to $C_{20}$ or higher)
         n-octyl alcohol
         2-ethylhexyl alcohol
         oxo alcohol of butylene dimer
         n-decyl alcohol
         oxo alcohol of propylene trimer
         lauryl alcohol
         oxo alcohol of propylene tetramer
         oxo alcohol of butylene trimer
         myristyl alcohol
         cetyl alcohol
         oxo alcohol of propylene pentamer
         oxo alcohol of butylene tetramer
         stearyl alcohol
         eicosyl alcohol
         docosyl alcohol
   (2) Unsaturated alcohols (olefinic, diolefinic, acetylenic, etc.)
      (a) Short chain ($C_3$ to $C_7$)
         allyl alcohol
         propargyl alcohol
         methallyl alcohol
         butadiene-2,3-yl-1 alcohol
         crotonyl alcohol
         penten-4-yl-2 alcohol
         4-methylpenten-3-yl-1 alcohol
      (b) Long chain ($C_8$ to $C_{20}$ or higher)
         citronellol
         geraniol
         palmitoleyl alcohol
         arachidonyl alcohol
         clupanodonyl alcohol
         lauroleyl alcohol
         myristoleyl alcohol
         oleyl alcohol
         linoleyl alcohol
         linolenyl alcohol
         elaeostearyl alcohol
         erucyl alcohol
         gadoleyl alcohol
   (3) Cyclic alcohols
      (a) Monocyclic
         (i) Aromatic (including alkaryl, aralkyl, etc.)
            phenols
            cresols
            benzyl alcohol
            styryl alcohol
            cinnamyl alcohol
            hydroxydiphenyls
            carvacrol
            thymol TABLE I—Continued β-phenylethanol
(ii) Cycloaliphatic (saturated or unsaturated)
cyclohexanol
cyclohexenol
cyclohexyl carbinol
4-cyclohexyl-cyclohexanol
(iii) Heterocyclic
furfuryl alcohol
tetrahydrofurfuryl alcohol
β-hydroxyethylpyridine
(b) Polycyclic alcohols
(i) Aromatic (fused, bicyclic, or spiro)
α-naphthol
β-naphthol
α-anthrol
β-anthrol
5,6-dihydro-1-hydroxynaphthalene
xenol
diphenyl carbitol
(ii) Cycloaliphatic
borneol
abietinol
hydroabietinol
dehydroabietinol
dihydroabietinol
tetrahydroabietinol
(iii) Heterocyclic
quinolinol
(B) Polar substituted alcohols
(1) Polyhydric alcohols
(a) Dihydric alcohols
ethylene glycol
diethylene glycol
triethylene glycol
propylene glycol
trimethylene glycol
polymethylene glycols
pinacol
2,2-di(4-hydroxyphenyl)propane
4,4'-dihydroxydiphenyl
glycerol monochlorohydrin
o- and p-hydroxybenzyl alcohols
coniferyl alcohol
pyrocatechol
resorcinol
hydroquinone
(b) Trihydric alcohols
glycerol
tri-hydroxy pentachlorobiphenyl
pyrogallol
triethanolamine
1,1,2-trihydroxybutane
1,2,3-trimethylol propane
(c) Tetrahydric alcohols
erythritol pentaerythritol
(d) Pentahydric alcohols
arabitol
xylitol
adonitol
(e) Hexahydric alcohols
mannitol
dulcitol
sorbitol
(f) Miscellaneous polyhydric alcohols
lignin
polyvinyl alcohol
polyallyl alcohol
cellulose
starch
(2) Amino alcohols (particularly tertiary amino)
p-(dimethylamino)phenol
triethanol amine
N,N-dimethylaminoethanol
N-(β-hydroxyethyl)morpholine
(3) Hydroxy acids
salicylic acid
malic acid
lactic acid
citric acid
hydracrylic acids
glycollic acid
hydroxysulfonic acids
(4) Halo alcohols
β-chloroethanol
glycerol dichlorohydrin
(5) Cyano alcohols
ethylene/cyanohydrin
β-(β'-cyanoethoxy)ethanol
(6) Epoxy alcohols
glycidol
(7) Ether alcohols (especially condensation products of ethylene oxide, propylene oxide, etc.)
diethylene glycol
triethylene glycol
polyethylene glycols
methyl carbitol
butyl carbitol
methyl Cellosolve
butyl Cellosolve
guaiacol
(C) Simple amines (i.e., without polar substitutions)
(1) Alkyl amines (normal or branched; primary or secondary)
(a) Short chain alkyl ($C_1$ to $C_7$)
methylamine
dimethylamine
ethylamine
n-propylamine
isopropylamine
diisopropylamine
ethylisopropylamine
n-butylamine
tert.-amylamine
methyl-n-hexylamine
3-methylpentylamine
1,3-dimethylbutylamine
n-heptylamine
3,5-dimethylpentylamine
(b) Long chain alkyl ($C_8$ to $C_{20}$ or higher)
n-octylamine
2-ethylhexylamine
nonylamine (from oxo alcohol of butylene dimer)
n-decylamine
tert.-decylamine (from oxo alcohol of propylene trimer)
laurylamine
laurylmethylamine
tert.-tridecylamine (from oxo alcohol of propylene tetramer or butylene trimer)
cetylamine
stearylamine
(2) Unsaturated amines (olefinic, diolefinic, acetylenic, etc.)
(a) Short chain ($C_3$ to $C_7$)
allylamine
allylmethylamine
methallylamine
crotonylamine
penten-4-yl-2-amine
ethyl-4-methylpenten-3-yl-1-amine
(b) Long chain ($C_8$ to $C_{20}$ or higher)
lauroleylamine
myristoleylamine
oleylamine
linoleylamine
linolenylamine
erucylamine
gadoleylamine
elaiostearylamine
(3) Cyclic amines
(a) Monocyclic
(i) Aromatic
aniline
toluidines
β-phenylethylamine
xylidenes
benzylamine
ar-dodecylanilines
(ii) Cycloaliphatic (saturated or unsaturated)
cyclohexylamine
N,N-dicyclohexylamine
cyclopentylamine
tetrahydroaniline
(iii) Heterocyclic
(a) Ring nitrogen
morpholine
piperidine

TABLE I—Continued piperazine
oxazoline
acridine
- (b) Extra nuclear nitrogen
  - aminopyridine
  - 2-aminopyrimidine
  - furfurylamine
- (b) Polycyclic amines (including aromatic, cycloaliphatic, and heterocyclic amines)
  - naphthylamine
  - quinoline
  - aminoquinoline (D) Polar substituted amines
  (1) Polyamines
    (a) Aliphatic polyamines
      - ethylene diamine
      - diethylene triamine
      - higher ethylene polyamines
      - propylene diamine
      - N-keryl-N-($\beta$-ethylamine)
    (b) Cyclic polyamines (including aromatic, cycloaliphatic or heterocyclic polyamines)
      - phenylene diamine
      - triaminotoluenes
      - diaminophenols
  (2) Hydroxy amines
    (a) Aliphatic amines
      - ethanolamine
      - diethanolamine
      - N-methylethanolamine
    (b) Cyclic amines
      - N-($\beta$-hydroxyethyl)aniline
      - p-hydroxycyclohexylamine
  (3) Amino acids
    - glycine
    - alanine
    - phenylalanine
    - leucine
  (4) Halo amines
    - chloroanilines
    - chloropyridine
    - chlorotoluidines
    - chlorophenylenediamine It should be recognized that one or more of the oxygen atoms in the foregoing hydroxy, epoxy, carboxy and the like alcohol and amino compounds can be replaced by sulfur atoms to give the corresponding thio compounds and polymers. Consequently, the term estamides as used in this specification include the sulfur analogs of the oxygen-containing compounds.

Some of the partial estamides described above can be utilized without further chemical modification. For example, the half-butyl ester can be cast from alcohol solution to give a hard glossy film—although it is subject to attack by aqueous and organic solvents. The major utility for the partial estamides is as intermediates for further reaction to form other useful products as described hereinafter.

The further reactions of the partial estamides are of two general types: one involves reactions of remaining free carboxyl and/or anhydride groups; the other involves reactions of or with the ester and/or amide groups, i.e., functional or reactive groups attached to the ethylene/maleic anyhdride copolymer through the oxygen atom in the ester linkage, or the nitrogen atom in the amide linkage.

Reactions with the remaining carboxyl or anhydride groups may involve all or only a part of these remaining groups. If the anhydride groups of a partial half estamide are to be reacted to form the complete half estamide, then none of the new estamide groups will be attached to adjacent carbon atoms. Likewise, if the carboxyl groups of a partial diestamide are to be further reacted to approach the complete diestamide, none of the new estamide groups will be attached to adjacent carbon atoms. Only if the anhydride groups of a partial half estamide are reacted with sufficient alcohol or amine to form a partial or complete diestamide would some of the new estamide groups be attached to adjacent carbon atoms. It is a relatively simple matter to stop the reaction at the half estamide, since more rigorous conditions are required to make the second carboxyl group of each maleic anhydride unit react. In view of the foregoing, it will be readily apparent that the present invention offers numerous possibilities for controlled construction of specifically designed polymer molecules—thereby making it possible to obtain uniquely desirable properties not possible heretofore.

Further reactions of the unreacted carboxyl or anhydride groups of the above-described partial estamides can be generally classified in the following five categories:

(1) Neutralization of the carboxyl group (or hydrolysis of the anhydride) with a metal or ammonium hydroxde or alkaline salt.

(2) Reaction with ammonia to form an unsubstituted amide.

(3) Cross-linking by reaction with polyhydroxy compounds, polyamines, or hydroxyamines.

(4) Reaction of adjacent primary amide and carboxyl groups to form imides.

(5) Further esterification with alcohols or further amidation with primary or secondary amines.

(1) Neutralization (or hydrolysis) can be carried out in a conventional manner using ammonia, or the hydroxides or basic salts of ammonia or the desired metal. In general, the alkaline earth and alkali metal derivatives, and especially the sodium and potassium salts, are preferred.

(2) The unsubstituted amide can be prepared from unreacted anhydride groups by direct reaction with ammonia. They can also be prepared from the carboxyl groups by forming the ammonium salt and subsequently heating to eliminate water.

(3) Cross-linking of the polymeric partial estamide by reaction of the carboxyl (or anhydride groups) with polyhydroxy compounds, polyamines, or amino alcohols is most effectively carried out with partial estamides in which the ester or amide groups are relatively small—e.g., methyl, ethyl or proply esters or amides or equivalent short chain substituted ester or amide groups. With these short chain estamides the cross-linking is carried out readily by heating with the cross-linking agent. With large ester or amide groups the cross-linking action is markedly slower—possibly due to a steric shielding effect.

(4) Imides can be formed from partial primary amides by reaction between the primary amide and the adjacent carboxyl radial. This reaction is generally carried out by preparing a half amide, then heating to expel water and form the imide.

(5) Further esterification and/or amidation of the above-described partial estamides can be carried out by reacting with any one or more of the alcohols and/or amines listed in Table I. If the alcohol or amine is the same as was used to form the partial ester or amide, the resulting product will be a symmetrical diester or diamide, as distinguished from the unsymmetrical diester or diamide obtained by esterifying or amidating with an alcohol or amine unlike that utilized in the formation of the partial ester or amide polymer.

Of particular interest with respect to the present invention are the unsymmetrical estamides formed from the partial estamides set forth in the left-hand column of Table II, by further esterification and/or amidation with the corresponding alcohols and/or amines set forth in the right-hand column of that table. These unsymmetrical estamides include not only the diestamides, but any polymeric estamide, partial or complete, containing more than one different kind of ester and/or amide group attached to the polymeric ethylene/maleic anhydride copolymer backbone.

TABLE II

| Polymer Numbers | Alcohol or Amine [1] used to form Partial Estamide | Alcohol or Amine [1] used to form Unsymmetrical Estamide |
|---|---|---|
| 1 | Short chain alkyl alcohols or amines (A.1.a. and C.1.a.). | Long chain alkyl alcohols or amines (A.1.b. and C.1.b.). Long chain unsaturated (especially alkenyl) alcohols or amines (A.2.b. and C.2.b.). Polyhydric alcohols, especially glycols (B.1.). Polyamines, especially diamines (D.1.). Epoxy alcohols (B.6.). |
| 2 | Short chain unsaturated (especially alkenyl) alcohols or amines (A.2.a. and C.2.a.). | Long chain unsaturated (especially alkenyl) alcohols or amines (A.2.b. and C.2.b.). Cyclic alcohols or amines (A.3. and C.3., and especially C.3.b.ii.). Polyamines, especially diamines (D.1.). |
| 3 | Long chain unsaturated (especially alkenyl) alcohols or amines (A.2.b. and C.2.b.). | Polyamines, especially diamines (D.1.). |
| 4 | Long chain alkyl alcohols or amines (A.1.b. and C.1.b.). | Polyhydric alcohols, especially glycols (B.1.). Polyamines, especially diamines (D.1.). Hydroxysulfonic acids. |
| 5 | Cyclic alcohols or amines (A.3. and C.3., and especially C.3.a.ii.). | Long chain unsaturated (especially alkenyl) alcohols or amines (A.2.b. and C.2.b.). |
| 6 | Tertiary amino alcohols (B.2.). | Long chain alkenyl alcohols or amines (A.2.b. and C.2.b.). |
| 7 | Halo alcohols or amines (B.4. and D.4.). | Long chain alkyl alcohols or amines (A.1.b. and C.1.b.). |

[1] The number and letter designations in parentheses refer to the classes (and illustrative species listed thereunder) set forth in Table I.

Reactions involving the ester or amide groups of the partial estamides of this invention are of numerous different types and will depend upon the particular ester or amide groups present in the partial estamide as well as upon the type of product or polymer derivative to be prepared and the desired properties to be obtained. For example, the partial estamides containing alkenyl or other unsaturated groups can be modified by hydrogenation, epoxidation, sulfurization, halogenation, hydro-halogenation, isomerization, polymerization, and similar reactions involving the olefinic or other unsaturated carbon to carbon bonds.

The polymerization reactions mentioned immediately above are particularly valuable—especially with respect to film forming resins and coating resins, or with respect to polymers for modification of or incorporation into coating compositions. The polymerization reactions can be generally classified into two different categories, although both types of polymerization will often occur either sequentially or concurrently.

The first general type of polymerization is known as oxidative polymerization and involves the formation of oxygen bridges between the unsaturated carbon to carbon bonds in the ester or amide groups of the partial estamides. This type of polymerization is particularly useful with respect to the aforementioned polymeric half estamides which contain long chain alkenyl groups. These can be used as synthetic drying oils having hardening or drying characteristics quite similar to linseed oil. The oxidative type of polymerization can also be effected with sulfur in place of oxygen. This sulfur polymerization or cross-linking action is often termed vulcanization. However, because of the close analogy of the polymerization reaction using sulfur and oxygen, both types are considered herein as being within the scope of the term oxidative polymerization.

The second type of polymerization involving the unsaturated carbon to carbon bonds of the earlier-described partial estamides can be classified as heat (or vinyl) polymerization. This vinyl polymerization can be homopolymerization (i.e., polymerization of like molecules of the unsaturated partial estamides containing polymerizable vinyl groups), or it can be interpolymerization of said partial estamides with other polymerizable vinyl compounds. Examples of these latter vinyl compounds are the vinyl aromatics, e.g., styrene, α-methylstyrene, vinyltoluene, etc.; acrylic acid and esters thereof, e.g., methyl, ethyl, propyl, tertiary butyl, 2-ethylhexyl, n-octyl, nonyl, dodecyl, tridecyl, and hexadecyl acrylates; methacrylic acid and the alkyl esters thereof, e.g., methyl, ethyl, propyl, tertiary butyl, 2-ethylhexyl, n-octyl, nonyl, dodecyl, tridecyl, and hexadecyl methacrylates; acrylonitrile; vinyl esters of fatty acids, e.g., vinyl acetate, vinyl propionate, vinyl butyrate, etc.; vinyl ethers; acrylamides; acrolein acetals, etc.

Other general reactions of considerable importance involve the partial esters of polyhydric alcohols or the partial amides of hydroxyl amines—i.e., estamides having free hydroxyl groups. These hydroxyl groups can be subjected to esterification, reaction with isocyanates to form urethanes, reaction with alcohols to form ethers, conversion of polyhydroxyl compounds having vicinal hydroxyl groups to form aldehydes and acetals, etc.

Esterification of the hydroxyl-containing partial estamides are especially important. These esterification reactions can be carried out in numerous different ways. For example, the hydroxyl-containing partial estamides can be self-esterified by interaction between the hydroxyl substituents on the ester and/or amide groups of one polymer molecule and the free carboxyl or previously unreacted anhydride groups of another polymer molecule.

Another type of esterification reaction is the polyester formation obtained by cross-linking the hydroxyl-containing partial estamides with dibasic or polybasic carboxylic acids or their corresponding anhydrides. Examples of such cross-linking agents are the cyclic acids (including aromatic acids); e.g., phthalic acid, terephthalic acid, isophthalic acid, hexahydrophthalic acid, tetrahydrophthalic acid, etc., unsaturated acids, e.g., maleic acid, fumaric acid, etc.; saturated aliphatic acids, e.g., succinic acid, adipic acid, sebacic acid, etc.; tricarboxylic acids, e.g., tricarballylic acid, etc.; and the anhydrides of such acids.

A somewhat more complex esterification is carried out by cooking the hydroxyl-containing partial estamides with a mixture of one or more polyhydroxy compounds and one or more polycarboxylic acids. In this way, a complex polyester is obtained which can contain several types of cross-linking. For example, the free carboxyl or anhydride groups of the partially esterified or amidated ethylene/maleic anhydride copolymers can be cross-linked through the polyhydroxy compounds. Likewise, the hydroxyl substituents on the ester and/or amide groups of the partially esterified or amidated ethylene/maleic anhydride copolymers can be cross-linked through the polycarboxylic acids. There can be further cross-linking between the hydroxyl and the carboxyl substituents of the ester and/or amide groups by linking through an intermediate reaction product (of the polyhydroxy compound and the polycarboxylic acid) containing both a hydroxyl and a carboxyl group. Examples of suitable polyhydroxy compounds for the aforementioned complex polyester formation are those set forth in Table I, class B.I. Examples of suitable polycarboxyl compounds are those set forth in the preceding paragraph.

Other polymers of particular interest are the graft polymers obtained by reaction of the above-described hydroxyl-containing partial estamides with preformed polyester resins containing one or more terminal hydroxyl and/or carboxyl groups.

Other useful esterification reactions of the present hydroxyl-containing partial esters and/or amides are those involving (1) reaction with alkyl phosphorous acids, (2) reactions of weak inorganic acids (such as boric acid, silicic acid, etc.), with vicinal hydroxyl groups on the partial estamides to form inorganic complexes with said partial estamides, and (3) reactions with silicon compounds such as silanols or halosilanes to give the corresponding silicyl derivatives.

Another particularly interesting derivative is obtained by the reaction of the aforementioned hydroxyl-containing partial estamides with isocyanates to give urethanes. For this purpose, either the monoisocyanates, such as ethyl isocyanate, propyl isocyanate, phenyl isocyanate, m-tolyl isocyanate, α-naphthyl isocyanate, etc., or the di- and higher polyisocyanates such as tolylene diisocyanate, diphenylmethane diisocyanate, triphenylmethane triisocyanate, etc., or polymeric materials containing a multiplicity of isocyanate groups are useful. The product obtained from the monoisocyanate reaction will differ somewhat from those obtained with the polyisocyanates, since the latter will be cross-linked polyurethane polymers.

A somewhat different type of polymer can be obtained by reaction of the aforementioned hydroxyl-containing partial estamides of ethylene/maleic anhydride copolymers with other alcohols to yield the corresponding ethers. Of particular importance is the ether obtained by reaction of the aforementioned hydroxyl containing estamides with epihalohydrins, e.g., epichlorohydrin, to give polyether chains containing terminal epoxy groups thereon. In this way, there is obtained an epoxy-type resin which can be cured with conventional curing agents in substantially the same manner as the more conventional epoxy resins.

The preceding discussion has delt with reactions involving the ester or amide groups of partial estamides. It will be readily apparent, however, that all of such reactions which do not involve free carboxyl or anhydride groups (of the original ethylene/maleic anhydride backbone polymer) are applicable to diestamides (either symmetrical or unsymmetrical) as well as partial estamides. Of particular (though not by any means exclusive) interest are reactions involving oxidative and/or vinyl polymerization, and esterification and other reactions involving hydroxyl or amino substituted ester and amide groups.

The following examples are presented as illustrative preparations of various types of polymeric compositions of the present invention. Unless otherwise specified, the ethylene/maleic anhydride copolymer used as a starting material is of relatively low molecular weight, e.g., having a specific viscosity of from 0.008 to 0.12 (1 wt. percent solution in dimethylformamide at 25° C.).

EXAMPLE 1

*Half ester of n-propyl alcohol*

One hundred twenty-six grams of ethylene/maleic anhydride copolymer and 385.5 grams of n-propyl alcohol were heated at reflux for 4 hours to give a clear homogeneous solution. After heating for an additional 3¼ hours the reaction mixture was mixed with an excess of water to give a precipitate which was washed with water and dried at 110° C. in a vacuum oven for 18 hours. The resulting polymeric half ester was a dry brittle solid soluble in alcohol and acetone. This half ester is useful as an intermediate involving reactions with the free carboxyl groups in the manner described in many of the following examples.

EXAMPLE 2

*Half ester of n-butyl alcohol*

One hundred twenty-six grams of ethylene/maleic anhydride copolymer and 271 grams of n-butyl alcohol were heated at reflux for 30 minutes to give a clear homogeneous solution. Refluxing was continued for an additional 4½ hours, after which the product was precipitated as an oil by pouring the reaction mass into n-hexane. The precipitated oil was washed four times, each time with a three-fold excess of hexane. The crude product was heated on a steam bath to remove hexane, and then dried in a vacuum oven for 18 hours at 120° C. to remove any unreacted butyl alcohol. The product, the half ester of ethylene/maleic anhydride and n-butyl alcohol, had a stiff, taffy-like consistency at 120° C. but hardened to a brittle solid at room temperature. This half ester is useful as an intermediate in the formation of products involving reactions of the remaining free carboxyl groups in accordance with many of the following examples.

EXAMPLE 3

*Half ester of n-octyl alcohol*

One hundred twenty-six grams of ethylene/maleic anhydride copolymer, an equimolar quantity of n-octanol and 152 ml. of xylene were cooked for 2 hours at about 145° C. until the reaction mass was substantially a clear solution. The xylene was then stripped from the reaction mass. The resulting product, a half ester of the ethylene/maleic anhydride copolymer and n-octyl alcohol, was a clear viscous liquid at 80° C. or higher, a flexible semi-solid exhibiting slight cold-flow properties at temperatures slightly above room temperature, and a brittle solid at 25° C. and below. This half ester is useful as an intermediate in the formation of coating resins. (See Example 24 below.)

EXAMPLE 4

*Half ester of allyl alcohol*

One hundred twenty-six grams of ethylene/maleic anhydride copolymer and 232 grams of allyl alcohol were mixed together and heated at reflux for 1½ hours, after which time the reaction mass was a clear homogeneous liquid. The mass was cooled and mixed with 2500 ml. of water to precipitate the crude product, which was then extracted twice with boiling water and dried in a vacuum oven at 60° C. for 24 hours to give a brittle solid product, the half ester of ethylene/maleic anhydride copolymer and allyl alcohol. This half ester is useful as an intermediate in the formation of resinous products by reaction of the free carboxyl groups in the manner described in many of the following examples.

EXAMPLE 5

*Half ester of hydroabietyl alcohol*

One hundred twenty-six grams of ethylene/maleic anhydride copolymer, 340 grams of hydroabietyl alcohol, 100 ml. of xylene and 1 ml. of 85% orthophosphoric acid were mixed together and cooked for about 3 hours at reflux temperature under a nitrogen atmosphere. During this 3 hours the reflux temperature gradually increased to a final temperature of 230° C. as xylene was periodically withdrawn by distillation, leaving a slightly hazy, light amber, brittle resinous product insoluble in concentrated ammonium hydroxide, sodium hydroxide, alcohol and acetone, but soluble in benzene and xylene. This product, the half ester of ethylene/maleic anhydride and hydroabietyl alcohol, was melted with an equal portion of beeswax to give a white, homogeneous product similar to, but more flexible than, beeswax. This half ester is also useful as an intermediate in the formation of products by reaction of the free carboxyl groups in the manner described in many of the following examples.

EXAMPLE 6

*Half ester of N,N-dimethylaminoethanol*

Equi-molar quantities of ethylene/maleic anhydride copolymer and N,N-dimethylaminoethanol were dissolved in separate portions of actone and mixed together to form an orange-red precipitate. The precipitate was washed with acetone, ground in benzene, filtered and rewashed with benzene. This crude product was further purified by boiling for 10 minutes in xylene, cooling, filtering and drying. The pink, powdery product, the half ester of ethylene/maleic anhydride copolymer and N,N-dimethylaminoethanol, is spontaneously dispersable (though not soluble) in water, is solubilized by the addition of a small amount of either alkali or acid, but is reprecipitated by excess acid. This half ester is useful as a precipitant, flocculant, protective colloid, intermediate or polyampholyte.

EXAMPLE 7

Half ester of N-hydroxyethylmorpholine

Equi-molar quantities of ethylene/maleic anhydride copolymer and N-hydroxyethylmorpholine were dissolved in separate proportions of acetone and then mixed together to form a reddish-pink precipitate. The precipitate was washed with acetone and then xylene. The crude product was further purified by refluxing in xylene for a half hour. The final product, the half ester of ethylene/maleic anhydride copolymer and N-hydroxyethylmorpholine was soluble in water, in aqueous acid down to a pH of 2, and in aqueous base up to a pH of 10. Alkalinity above pH 10 resulted in slight, white, flocculent precipitates. The half ester product is useful as a flocculent. It is also useful as an intermediate in the formation (by cross-linking the free carboxyl groups with materials such as glycols, diamines, etc.) of anion exchange resins.

EXAMPLE 8

70% partial diester of n-butyl alcohol

A mixture of 254.4 grams of n-butanol, 131 grams of ethylene/maleic anhydride and 100 ml. of xylene were refluxed for 16 hours, during which time approximately 13 ml. of water were removed. Three hundred milliliters of the mixture was then distilled off, leaving a clear, viscous residue which was washed in an excess of water and redissolved in methanol. The product was reprecipitated and washed twice more with water and heated to 175° C. to remove residual solvent. The opaque, viscous liquid product was the partial diester of ethlyene/maleic anhydride copolymer and n-butyl alcohol in which about 30% of the carbonyl groups remained as free carboxyl groups.

EXAMPLE 9

72.5% partial diester of decyl alcohol

One hundred twenty-six grams of ethylene/maleic anhydride copolymer, 221.2 grams of a $C_{10}$ "Oxo" alcohol, 185 ml. of xylene and 1 gram of p-toluenesulfonic acid were refluxed under a nitrogen atmosphere for about 12 hours. The still temperature gradually increased from an initial temperature of about 107° C. to a final temperature of 232° C., during which time 15.4 ml. of water and most of the xylene were distilled from the reaction mixture. The crude product remaining in the still was purified by washing four times with methanol and once with water, and drying at 110° C. for 8 hours in a vacuum oven. The product was a partial diester of ethylene/maleic anhydride copolymer and "Oxo" decanol in which all but about 27.5% of the carbonyl groups in the copolymer were esterified with the decyl alcohol, the remaining carbonyl groups being present as carboxyl groups.

EXAMPLE 10

Diester of unsaturated $C_{18}$ alcohols

A mixture of 63 grams of ethylene/maleic anhydride copolymer, 268.4 grams of unsaturated alcohols obtained by reduction of soy bean oil, 95 ml. of xylene and 1 ml. of 85% orthophosphoric acid were heated for about 6 hours at gradually increasing reflux temperatures (initial 110° C., final 259° C.) while distilling off 8.5 ml. of water and most of the xylene. The product was a substantially complete diester (97% of carbonyl groups converted to ester groups). Films of the diester polymer air dried on metal in about 48 hours to form an attractive wrinkle finish coating. Addition of about 0.05% of cobalt naphthenate decreased the drying time to about 24 hours. Baking the films at 155° C. decreased the drying time to 20 minutes and resulted in formation of clear, smooth films rather than the wrinkle finish obtained by air drying. The diester was modified by cooking portions thereof with (a) petroleum resins, (b) rosin, and (c) a 1:3 mixture of rosin and the pentaerythritol ester of resin. Each of these modifications of the diester gave hard flexible films when cast from 50 wt. percent solutions in xylene.

EXAMPLE 11

Diester of unsaturated $C_{18}$ alcohols

A diester analogous to that described in the preceding example was prepared from ethylene/maleic anhydride copolymer and the unsaturated alcohols derived by reduction from linseed oil. The polymeric product, a viscous, pale amber oil was made up as a 78% solution in xylene containing 0.05% cobalt naphthenate. A film of the solution was applied to a sheet of tin plate and dried overnight to form a soft but tough glossy coating.

EXAMPLE 12

Diester of hydroabietyl alcohol

A mixture of 160 grams of hydroabietyl alcohol, 31.5 grams of ethylene/maleic anhydride copolymer, 160 ml. of xylene and 1.0 grams of p-toluenesulfonic acid were heated for about 7 hours at reflux temperatures (gradually increasing from about 131.5° C. to 261° C.), while distilling off 4.8 ml. of water and most of the xylene. The crude product remaining in the still was an amber liquid, very viscous at room temperature. Thirty-five grams of this crude product was washed with several 75 ml. portions of acetone and a 50 ml. portion of methanol, and dried at 70° C. for 4 hours in a vacuum oven to give a brittle resinous product (the substantially complete diester of ethylene/maleic anhydride and hydroabietyl alcohol), soluble in benzene and hexane and insoluble in linseed oil. The resin was, however, compatible with linseed oil in benzene solution. Such a solution was applied upon a sheet of tin plate and air dried to a clear, smooth coating. This diester is especially useful as a wood sealer, or as a resin component in a varnish composition.

EXAMPLE 13

Diamide of dehydroabietylamine

About 5 grams of ethylene/maleic anhydride copolymer and an excess of dehydroabietylamine were heated together at reflux temperature. The ethylene/maleic anhydride polymer initially dissolved in the hot amine, then precipitated as a gummy mass which returned to solution as reaction continued. The heating was continued for about ½ hour, after which the product was precipitated as a pink, soft mass in 2–B alcohol. Repeated washing with the alcohol gave a white powder soluble in benzene and hexane. A solution of about 50 wt. percent of the resinous product (the diamide of ethylene/maleic anhydride copolymer and dehydroabietyl amine) in benzene was used to cast a clear, colorless film upon a sheet of tin plate. This diamide is particularly useful as a wood filler (applied in a volatile solvent) and as a resin component of a varnish composition.

EXAMPLE 14

Mixed half amide of dehydroabietylamine and hexadecylamine

A solution of 12.6 grams of ethylene/maleic anhydride copolymer (specific viscosity 1.2) in 200 ml. of acetone and a solution of 28.4 grams of dehydroabietylamine and 2.4 grams of hexadecylamine in 50 ml. of acetone were mixed together to give a clear, red solution which first turned orange and then changed to an opaque, pinkish milk-like liquid. Addition of a few drops of 2-ethylhexylamine caused precipitation of a rubbery, pinkish white mass which was removed from the remaining liquid, triturated in 50 ml. of acetone, separated from the acetone and dried in a vacuum oven for 4 hours at 60° C. The resulting white powdery product (the half amide of ethylene/maleic anhydride copolymer and the above-described mixture of amines) was insoluble in benzene, but soluble in pyridine—from which a hard, clear film was cast upon a sheet of tin plate. This half amide is also useful as a cross-linking agent for ethylene glycol/phthalic anhydride polyester resins.

EXAMPLE 15

*Mixed diester of n-propyl alcohol (50%) and unsaturated $C_{18}$ alcohols (50%)*

One hundred twenty-six grams of ethylene/maleic anhydride copolymer, 240 grams of n-propyl alcohol and 2 ml. of 85% orthophosphoric acid were heated at reflux (97–102° C.) until their homogeneous solution was obtained. This took about 4 hours. One hundred ten milliliters of excess propyl alcohol was distilled off. During the next 40 minutes there was added 268.4 grams of the unsaturated alcohols obtained by reduction of soy bean oil fatty acids. An additional 104 ml. of propyl alcohol were distilled from the mixture at 160° C. and 160 ml. of xylene was added. A total of 76 ml. of distillate (propyl alcohol and water) was removed during the ensuing period of about 17 hours, at which time the still temperature had reached about 246° C. A total of 11.6 ml. of water were removed during the esterification reactions. The resulting resin was dissolved as a 47.4 weight percent solution in xylene. These solutions applied to tin plate gave attractive wrinkle finish films which were dry to the touch after 4 hours and were tack-free after 36 hours. Addition of 0.05% cobalt (as the naphthenate) gave tack-free films in only 3 hours. When baked (instead of air dried at room temperature), they gave a smooth, glossy film rather than a wrinkle finish.

EXAMPLE 16

*Mixed diester of n-butyl alcohol (70%) and linseed oil monoglyceride (30%)*

Seven and four-tenths grams of the 70% partial diester of ethylene/maleic anhydride and n-butyl alcohol prepared as described in Example 8, above, and 3.58 grams of the monoglyceride of linseed oil fatty acids were mixed together and cooked until the mixture was a clear solution. Heating was continued until just short of the point at which the polymer began to form a gel. Fifty percent solutions of the resulting resin in xylene can be air dried to form non-tacky, very adherent films upon metal, glass or ceramic surfaces.

EXAMPLE 17

*Mixed partial diester of n-butyl alcohol (50%) and ethylene glycol*

The half ester of ethylene/maleic anhydride copolymer (specific viscosity 0.6) and n-butyl alcohol was heated with an excess of ethylene glycol until the reaction mixture remained homogeneous upon cooling. The product was purified by twice dissolving in acetone and precipitating in water. The resulting product, containing 50% of the carbonyl groups as n-butyl ester groups, somewhat fewer as hydroxyethyl ester groups, and a few as free carboxyl groups, was a thermosetting resin which was heated to form a firm, hard coating—probably by additional cross-linking between the free carboxyl radicals and the hydroxyethyl groups. The resin is compatible with and suitable for modifying melamine, epoxy, and urea-type resins.

EXAMPLE 18

*Mixed partial diester of n-butyl alcohol (70%) and ethylene glycol*

The procedure described in the preceding example was duplicated except that the 70% partial diester described in Example 8 was utilized in place of the half ester. The resulting product was quite similar to that described in Example 17, except that it gave slightly softer films.

EXAMPLE 19

*Mixed partial diester-amide of n-butyl alcohol (70%) and monoethanolamine (30%)*

The 70% partial diester of n-butyl alcohol prepared as described in Example 8, above, was reacted with an excess (based upon the free carboxyl groups in the partial diester) of monoethanolamine. The mixture was heated until it remained clear and homogeneous upon cooling. The resin was purified twice by dissolving in acetone and precipitating in water. The product polymer was a mixed ester-amide containing 70% of the carbonyl groups as n-butyl ester groups and about 30% as N-hydroxyethylamide groups. The product was an amber thermoplastic resin which, unlike the corresponding hydroxyethyl ester, did not crosslink on further heating. This product is compatible with melamine, epoxy, and urea resins, and is useful as a modifying agent for such resins.

EXAMPLE 20

*Mixed diester of n-butyl alcohol (70%) and glycerol*

The procedure of Example 19 was duplicated except that glycerol was used in place of the monoethanolamine. The product was a mixed diester containing about 70% n-butyl ester groups and about 30% 2,3-dihydroxypropyl ester groups. The resin is slightly thermosetting, by virtue of light cross-linking upon further heating. The resin is compatible with melamine, epoxy and urea resins and is useful as a modifying polymer with those resins.

EXAMPLE 21

*Interpolymer of half ester of n-butyl alcohol and epoxy resin*

Eighteen grams of the half ester of n-butyl alcohol prepared as described in Example 2, above, 28 grams of toluene and 10 grams of "Epon 834" (an epoxy condensation polymer of epichlorohydrin and 2,2-di-(4-hydroxyphenyl)propane, having an epoxide equivalent of about 250) were heated at reflux for about 30 minutes. About 2 grams of long chain fatty acids (predominantly linoleic acid) was added and the heating was continued for another 15 minutes to give a clear, yellow viscous resin. A coating of the viscous liquid applied to a sheet of 31 gauge tin plate, air dried for 20 minutes and baked at 155° C. for 35 minutes, gave a hard but flexible film unattacked by xylene or caustic. The film was sufficiently flexible that the tin plate could be bent 180° around a ⅛ inch diameter rod without cracking the film.

EXAMPLE 22

*Interpolymer of half ester of n-butyl alcohol and epoxy resin*

Forty-eight grams of the half ester of ethylene/maleic anhydride copolymer (specific viscosity 0.6) and n-butyl alcohol was milled on a heated roll mill until the polymer had melted, and then 16 grams of "Epon 562" (an aliphatic modification of the epoxy resin described in the preceding example and having an epoxide equivalent of about 150) was slowly added while continuing the milling operation. The resulting mixture was taken from the rolls as a clear, homogeneous rubbery sheet which was cut in two sections and interspaced between three portions (2 grams each) of glass fiber. This laminated composition was pressed at 1000 pounds and 170° C. for ½ hour to give a clear, strong, hard laminate.

EXAMPLE 23

*Interpolymer of 72.5% partial diester of n-butyl alcohol and epoxy resin*

Thirty-three and one-half grams of a 72.5% partial diester of n-butyl alcohol prepared in the manner described in Example 8, above, was melted and mixed with 16⅔ grams of "Epon 562" to form a clear liquid mixture. The mixture was heated in a vacuum oven for 1½ hours at 150° C., and then on a hot plate for an additional ½ hour at 225° C., to form a clear, non-tacky, rubbery material having a consistency somewhat like, though tougher than, art gum. This resin is very useful as a pencil eraser.

EXAMPLE 24

*Mixed partial diester of n-octyl alcohol (50%) and ethylene glycol*

The half ester of n-octyl alcohol prepared as described in Example 3, above, was mixed with an excess (based upon the free carboxyl groups remaining in the half ester) of ethylene glycol and heated at reflux until the product remained clear upon cooling. A film of the resulting resin was cast upon a sheet of tin plate from an alcohol solution. This film air dried to a clear, tack-free soft coating which was then baked for ½ hour at 180° C. to form a hard, glossy cross-linked film completely resistant to water.

EXAMPLE 25

*Mixed partial diester of $C_{10}$ oxo alcohol (72.5%) and ethylene glycol*

Sixty-eight and four-tenths grams of the 72.5% partial diester of a $C_{10}$ "Oxo" alcohol prepared as described in Example 9, above, and 216.3 grams of ethylene glycol were heated at reflux for about 4 hours to esterify most of the remaining free carboxyl groups with hydroxyl ethyl groups. The crude product was recovered by mixing with water and xylene, recovering the organic layer and heating on a steam bath to remove the xylene—leaving the product as a viscous and rubbery (but not cross-linked) resin. Seventy-five parts of this resin was dissolved in an equal weight of xylene and mixed with 25 parts of a butylated melamine resin dissolved in 37.5 parts of butanol and coated upon a sheet of tin plate to give a coating which baked to a flexible, hard film.

EXAMPLE 26

*Mixed partial diester of $C_{10}$ oxo alcohol (72.5%) and glycerol*

The 72.5% partial diester of a $C_{10}$ "Oxo" alcohol (Example 9, above), and an excess (based upon the unreacted carboxyl groups in the partial diester) of glycerol were reacted in a manner analogous to that described in Example 20, above. The resulting product was a hazy, tough, tacky rubber-like material useful as an adhesive for pressure-sensitive tapes.

EXAMPLE 27

*Mixed partial diester of $C_{10}$ oxo alcohol (72.5%) and and ethanolamine*

The 72.5% partial diester of a $C_{10}$ "Oxo" alcohol prepared as described in Example 9, above, was reacted with an excess of monoethanolamine in a manner analogous to Example 19, above. The resulting resin was a dark, amber material somewhat darker in color than the partial diester before reaction with ethanol amine. It was a thermoplastic resin exhibiting no noticeable tendency to cross link on further heating. The resin is compatible with melamine, epoxy and urea resins and is useful as a modifying agent for such resins.

EXAMPLE 28

*Partial diester of $C_{10}$ oxo alcohol cross-linked with tolylene diisocyanate*

The 87% partial diester of a $C_{10}$ "Oxo" alcohol was cross-linked by heating with a small amount of 2,4-tolylene diisocyanate to give a soft, opaque, tacky cross-linked polymer useful as an adhesive.

EXAMPLE 29

*Mixed diester of allyl alcohol (50%) and unsaturated $C_{18}$ alcohols (50%)*

One hundred twenty-six grams of ethylene/maleic anhydride copolymer, 174 grams of allyl alcohol, 131.5 grams of benzene and 3.37 grams of 85% on orthophosphoric acid were mixed together and heated at reflux for about 1 hour, at which time the reaction mixture had formed a clear solution. One hundred and ten milliliters of distillate were taken off, and 268.4 grams of unsaturated alcohols obtained by reduction of soy bean oil fatty acids was added to the refluxing mixture over a period of about 1 hour and 20 minutes. Refluxing was continued for the next 3½ hours with periodic removal of aqueous distillate and replacement with xylene. At the end of this latter 3½ hours, 585 ml. of distillate had been taken overhead and the still temperature had reached 241° C. Sufficient xylene (about 500 ml.) was added to the reaction mixture to dilute the resin content to about 48 weight percent. A coating of the xylene solution applied to tin plate dried to the touch after 18 hours and baked to a hard, glossy film.

EXAMPLE 30

*Mixed diester of allyl alcohol (50%) and oleyl alcohol (50%)*

Nine and two-tenths grams of the half ester of allyl alcohol prepared as described in Example 4, above, and 13.4 grams of oleyl alcohol were heated together with periodic addition of sufficient xylene (about 25 ml.) to maintain the reaction temperature between about 170° and 175° C. for about ½ hour. The temperature was then allowed to rise to 185° C. and heating continued for another 15 minutes until ebullition had nearly ceased. The reaction mixture was further diluted with an additional 25 ml. of xylene. A film of this solution was applied to tin plate, air dried for 1 hour and baked at 160° C. for another hour. The resulting coating was tough and tack-free, and resistant to xylene and 10% caustic.

EXAMPLE 31

*Mixed diester-amine of allyl alcohol (50%) and unsaturated $C_{18}$ amine (50%)*

Eighteen and four-tenths grams of the half ester of allyl alcohol prepared as described in Example 4, above, and 26.5 grams of the unsaturated amine obtained from soy bean oil fatty acids were cooked with xylene until a viscous, clear mass was obtained which remained clear upon cooling. The resulting mixture was heated in a vacuum oven at 140° C. for 18 hours to give an amber, viscous liquid product which was dissolved in an equal volume of mineral spirits. This solution was applied as a coating upon a sheet of tin plate and baked for 25 minutes at 155° C. to form a waxy, soft film.

EXAMPLE 32

*Varnish containing half ester of hydroabietyl alcohol*

The half ester of hydroabietyl alcohol prepared as described in Example 5, above, was heated with an equal weight of linseed oil until a clear, homogeneous solution was formed. This varnish composition, applied to wood or metal, dried in about 36 hours to give a hard, glossy refractive film.

EXAMPLE 33

*Mixed diester of unsaturated $C_{18}$ alcohols and hydroabietyl alcohols*

Eighty-four grams of ethylene/maleic anhydride copolymer, 226.7 grams of hydroabietyl alcohol, 160 ml. of xylene and 2 ml. of 85% orthophosphoric acid were cooked at reflux temperature (140°–147° C.) until a substantially clear solution was formed (about 2 hours), after which 177.3 grams of a commercial mixture of long chain unsaturated alcohols (containing about 50 wt. percent linolenyl alcohol, about 30 wt. percent linoleyl alcohol, about 20 wt. percent oleyl alcohol) was added. Heating was continued for another seven hours, during which time water and xylene were removed and the temperature of the refluxing reaction mixture rose to 235° C. The resulting product was dissolved in an equal weight of mineral spirits, to which solution was added 0.2 wt. percent of lead naphthenate and 0.02 wt. percent cobalt naphthenate driers. Coatings of this material on metal dried in air in about 3½ hours to form a very tough, flexible, glossy film which was resistant to attack by xylene or 10% caustic and which withstood natural outdoor weathering tests for more than 3 months with no sign of failure.

EXAMPLE 34

*Mixed diester of hydroabietyl alcohol (50%) and unsaturated $C_{18}$ alcohols (50%)*

One hundred twenty-six grams of ethylene/maleic anhydride, 350 grams of hydroabietyl alcohol, 268.4 grams of alcohols obtained by reduction of soy bean oil fatty acids, 160 ml. of xylene and 2 ml. of 85% orthophosphoric acid were heated at refluxing temperature (160° C.) for about 4 hours until the reaction mixture formed a clear, homogeneous solution. Heating was continued for another 8 hours at which time the still temperature had reached 241° C. During this latter 8 hours, 15.5 ml. of water was distilled from the reaction mixture. The material remaining in the still was poured into ethanol to precipitate the crude resin product which was purified by repeated extraction with additional ethanol. The purified resin was dissolved in xylene to give a solution containing about 47% resin and about 0.05% of cobalt drier was added to the solution. The solution was applied to 31 gauge tin plate to form films which dried in air in 6 hours to a tack-free, glossy coating. A baked finish was formed in 15 minutes at 155° C. This latter film was very hard and adherent, yet sufficiently flexible that the film did not crack when the tin plate was bent through 180° around a ⅓ inch diameter metal rod.

EXAMPLE 35

*Mixed ester-amide of $C_{18}$ unsaturated alcohols and allyl amine*

Twelve and six-tenths grams of ethylene/maleic anhydride copolymer and 26.84 grams of the unsaturated alcohols obtained by reduction of soy bean oil fatty acids, and 0.1 ml. of 85% orthophosphoric acid were cooked in a beaker on a hot plate at a temperature somewhat above 200° C. until a clear, homogeneous solution had formed. The solution was cooled and an excess (based upon free carboxyl groups remaining in the partial ester) of allyl amine was added. The mixture was again heated to form the amide and drive off excess allyl amine. The product was cooled and dissolved in an equal volume of xylene to form a coating composition which could be either air dried or baked upon a metal surface to form a hard, flexible, clear film.

EXAMPLE 36

*Mixed ester amide of $C_{18}$ unsaturated alcohols and dehydroabietylamine*

Six and three-tenths grams of ethylene/maleic anhydride copolymer, 15.75 grams of dehydroabietylamine, 13.42 grams of unsaturated alcohols obtained by reduction of soy bean oil fatty acids were mixed together and heated to about 140° C. to form a homogeneous solution. The solution was maintained at about 140° C. for 15 minutes by periodic addition of xylene. Temperature was then allowed to rise to about 155° C. for 10 minutes and 0.01 ml. of 85% orthophosphoric acid was added. During the next 20 minutes the temperature was allowed to rise to about 210° C. and was then maintained between 180° C. and 200° C. for an additional 15 minutes. The product was mixed with 40 ml. of xylene to form a thin, amber solution from which films were cast. When dried in air, the films set to touch in 10 minutes and were substantially dry (but with a very slight tacky feeling) after 20 minutes. They dried rapidly when baked for 15 minutes at 155° C. to form a colorless film.

EXAMPLE 37

*Diester of $C_{18}$ unsaturated alcohols vulcanized with sulfur*

A diester of unsaturated alcohols prepared by reduction of soy bean oil fatty acids (Example 10, above) was cooked with 5 weight percent of sulfur until the sulfur had dissolved in the diester and the solution had begun to gel. The resulting product was a vulcanized or cross-linked clear, brown, fragile rubber useful as a factice.

EXAMPLE 38

*Mixed half amide of rosin amine and 2-ethylhexylamine*

A solution of 1.26 grams of ethylene/maleic anhydride copolymer (specific viscosity 1.2) in about 100 ml. of acetone was mixed with a second solution containing 2.36 grams of rosin amine and 0.32 grams of 2-ethylhexylamine in about 40 ml. of acetone. Upon initial mixing the solution turned orange and a precipitate was formed, but after a few minutes the color faded and the precipitate redissolved. The clear solution was diluted with an equal volume of water and was evaporated to dryness to give a friable white polymer. This was further dried by heating at 155° C. for 4 hours. The resulting mixed half amide was insoluble in water and hydrocarbon solvents but soluble in 1,1,2-trichloroethane and dimethylformamide. Hard, rigid films of the polymer were cast from these latter solvents.

EXAMPLE 39

*Mixed diester of $C_{10}$ "Oxo" alcohol (72.5%) and a polyester*

The 72.5% partial diester of a $C_{10}$ "Oxo" alcohol prepared as described in Example 9, above, was mixed with a molar excess (based upon the unreacted carboxyl groups remaining in the partial diester) of ethylene glycol at 140° C. until the mixture would remain clear and homogeneous upon cooling. Subsequent alternate additions of molar equivalents of phthalic anhydride and ethylene glycol were carried out with heating continued between each addition until the product remained clear upon cooling. This process was continued to a point just short of gel formation. The resulting product is useful as a thermosetting surface coating. The cured (thermally cross-linked) resin has particularly outstanding flexibility and metal adhesion characteristics.

EXAMPLE 40

*Mixed diester of n-octyl alcohol ethylene glycol and tung oil fatty acids*

A mixture of 12.8 grams of the half ester of n-octyl alcohol prepared as described in Example 3, above, 4.7 grams of ethylene glycol, 14.0 grams of tung oil fatty acids and 10 ml. of xylene were heated on a hot plate to a point just short of gel formation (30 minutes to a temperature of 210° C.). The mixture was diluted with an equal volume of xylene to form a viscous amber solution. Coatings of this solution upon 31 gauge tin plate dried in air in about 6 hours to form an attractive frosted film. When about 0.05% of cobalt (as the naphthenate) was added to the solution, it dried to a clear soft film in about 1 hour.

EXAMPLE 41

*Urethane cross-linked diester of decyl alcohol and ethylene glycol*

The hydroxyethyl-decyl diester prepared as described in Example 25, above, was prepared as a 50% solution in xylene (resin content 7.204 grams) to which 0.522 grams of 2,4-tolylene diisocyanate was added. The solution was immediately applied as an eight one-thousandth inch thickness film upon 31 gauge tin plate, air dried for 25 minutes and then baked for 15 minutes at 180° C. to give a tough, flexible, clear coating.

EXAMPLE 42

*Mixed diester-amide of allyl alcohol (50%), aniline (20%), and linseed oil monoglyceride (30%)*

Nine and two-tenths grams of the half ester of allyl alcohol prepared as described in Example 4, above, 1.86 grams of aniline, 5.37 grams of the monoglyceride of linseed oil, and 17 ml. of xylene were mixed together and heated until fused and dispersed. Heating was continued until the xylene had boiled off and the liquid had become quite thick. Residual unreacted monoglyceride was removed by extraction with hot xylene, leaving a friable tan polymer soluble in n-butanol. Films cast from n-butanol solution were dry to the touch in one half hour, and further dried to hard, clear, tough, mar-resistant coatings after 18 hours. The foregoing films (air dried) were soluble in ethanol, slightly attacked by water and destroyed by 1% sodium hydroxide solution. Baked films were completely resistant to water and alcohol and were only slightly attacked by 1% sodium hydroxide solution.

EXAMPLE 43

*Mixed diester-amide of allyl alcohol (50%), 2-ethylhexyl-amine (20%) and linseed oil monoglyceride (30%)*

Nine and two-tenths grams of the half allyl ester prepared as described in Example 4, above, 2.58 grams of 2-ethylhexyl amine, 5.37 grams of the monoglyceride of linseed oil and 17 ml. of xylene were heated together until the xylene had boiled off, leaving a clear, homogeneous, amber solution. Heating was continued until just short of the point at which the solution began to gel. A solution of the resin in acetone and butanol/acetone was air-dried in 2 hours and baked for 30 minutes to form an amber, glossy, hard coating on glass. The film was resistant to alcohol, water and 1% sodium hydroxide solution. It was sufficiently flexible to be stripped from the glass and wrapped around a 1/32 inch diameter rod without cracking the film. Films cast on 31 gauge tin plate were equally glossy, hard and flexible, and exhibited good adhesion to the metal.

EXAMPLE 44

*Mixed diester-amide of allyl alcohol (50%), N-octyl-amine (20%), and lineseed oil monoglyceride (30%)*

Nine and two-tenths grams of the half ester of allyl alcohol prepared as described in Example 4, above, 2.58 grams of n-octyl amine, 5.37 grams of the monoglyceride of linseed oil and 17 ml. of xylene were heated together and refluxed for about 10 minutes to form a clear, amber, homogeneous very viscous mass. Heating was discontinued at the incipient gelation point and the mass was dissolved as a clear, amber solution in 20 ml. of n-butanol. One drop of a saturated benzene solution of cobalt linoleate was added to a half portion of the butanol solution. A film was cast upon a glass plate, air dried for 17 hours and then baked for 20 minutes at 160° C. The resulting film was hard, tough and glossy and resistant to attack by water, alcohol and 10% caustic.

EXAMPLE 45

*Aluminum salt of half ester of oxo decyl alcohol*

One tenth mole of the decyl alcohol (the Oxo alcohol of a propylene trimer) half ester of ethylene/maleic copolymer and 0.1 mole of sodium hydroxide were heated at the boiling point in 100 ml. of water and then diluted with additional water to form a milky solution containing 1 weight percent of solids. A piece of filter paper was dipped first in the foregoing solution, then in a saturated solution of aluminum sulfate, and then rinsed with clear water and dried. The resulting paper was water repellent and was used to separate water from mixtures thereof with hexane, heptane carbon tetrachloride and benzene by filtering such mixtures through the paper.

It will be apparent from the preceding examples that there is a wide degree of permissible variation in the molecular weight of the ethylene/maleic anhydride copolymer used to form the estamides of the present invention. In general, the toughness or hardness of the resulting estamide will increase with increasing molecular weight of the ethylene/maleic anhydride copolymer utilized. However, higher molecular weight polymers tend to be less soluble in the conventional solvents and the viscosity of solutions of such polymers are markedly higher than solutions of lower molecular weight polymers. Thus, the high molecular weight polymers are more difficult to formulate. In general, preferred materials are those having molecular weights such that the polymers have a specific viscosity below about 0.2 or 0.3 when measured as a 1 weight percent solution in dimethylformamide at 25° C. These lower molecular weight polymers are somewhat more difficult to prepare than are the higher molecular weight materials. Special techniques for the preparation thereof are disclosed in the copending Johnson patent applications Serial No. 584,175, filed May 11, 1956, and Serial Nos. 603,211 and 603,212, filed August 10, 1956. Where higher molecular weight ethylene/maleic anhydride copolymers are to be used, the disadvantages of high molecular weight can be at least partially compensated for by formulation as an aqueous emulsion rather than as a solution.

Particularly preferred polymers of the present invention comprise the ethylene/maleic anhydride diestamides made up from two or more alcohols and/or amines. The properties of such diestamides can be varied at will by proper selection of species and proportions of appropriate esterifying or amidating groups. For example, as a general rule short chain aliphatic and cyclic alcohols and/or amines tend to increase the hardness of the polymers. Likewise, substitution of amide groups for ester groups will tend to increase the hardness as well as the softening temperatures of the polymers. Hardness of the polymers can also be increased by the use of cross-linking agents.

Coating compositions of the foregoing estamides, as well as other estamides of the present invention, can be formulated in the conventional manner. Such formulations can be made in volatile solvents (e.g., petroleum naphtha, mineral spirits, alcohols (especially butanol or higher boiling alcohols), aromatic hydrocarbons such as xylenes, toluene, etc., alkyl esters such as ethyl acetate, methylethyl ketone, etc.) or in aqueous emulsions, or in natural or synthetic drying oils. These coating compositions can also contain pigments, for example, metal powders such as aluminum, copper, gold, etc., zinc lead or titanium oxides, lead or zinc chromates, cadmium sulfoselenides phthalocyanine pigments, and the like. When formulated in drying-type compositions, any of the well known driers such as zirconium, cobalt, manganese, or lead rosinates, naphthenates, linoleates, 2-ethylhexanoates, etc. can be advantageously used. The compositions can also contain minor amounts of special purpose additives such as anti-skinning agents, anti-settling agents, anti-caking agents, and the like.

We claim:

1. A process which comprises esterifying a substantially equimolar copolymer of ethylene/maleic anhydride, wherein the repeating polymer structure

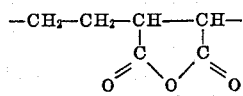

is termed the ethylene/maleic anhydride unit, with a long-chain polyethylenically unsaturated aliphatic alcohol containing from 8 to 20 carbon atoms, and mixtures of long-chain ethylenic aliphatic alcohols containing from 8 to 20 carbon atoms, wherein the polyethylenically unsaturated alcohols are present in a predominant amount in said mixtures, to provide the half ester and effecting the condensation reaction of the resultant second carboxyl group of the ethylene/maleic anhydride unit with a member selected from the group consisting of alcohols and amines and mixtures thereof containing up to 20 carbons atoms and free from substituents other than hydroxyl and amino radicals, said condensation reaction of the second carboxyl group with an alcohol forming an ester linkage and with an amine forming an amide linkage.

2. The process of claim 1, wherein the predominantly polyethylenically unsaturated alcohol is a mixture of olefinic monohydric alcohols containing about 18 carbon atoms and the secondary reactant is an alcohol.

3. The process of claim 1, wherein the predominantly polyethylenically unsaturated alcohol is a mixture of olefinic monohydric alcohols containing about 18 carbon atoms and the secondary reactant is an amine.

4. The process of claim 2, wherein the secondary reactant is a mixture of olefinic monohydric alcohols containing about 18 carbon atoms.

5. The process of claim 2, wherein the secondary reactant is hydroabietyl alcohol.

6. The process of claim 2, wherein the secondary reactant is allyl alcohol.

7. The process of claim 3, wherein the secondary reactant is allyl amine.

8. The process of claim 3, wherein the secondary reactant is dehydroabietylamine.

9. A resinous polymeric composition comprising a substantially equimolar copolymer of ethylene/maleic anhydride, wherein the repeating polymer structure

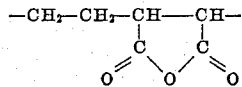

is termed the ethylene/maleic anhydride unit, wherein the ethylene/maleic anhydride unit is monoesterified with a long-chain polyethylenically unsaturated aliphatic alcohol containing from 8 to 20 carbon atoms, and mixtures of long-chain ethylenic aliphatic alcohols containing from 8 to 20 carbon atoms, wherein the polyethylenically unsaturated alcohols are present in a predominant amount in said mixtures, and the second carboxyl group of the ethylene/maleic anhydride unit is condensed with a member selected from the group consisting of alcohols and amines and mixtures thereof containing up to 20 carbon atoms and free from substituents other than hydroxyl and amino radicals, and the said second carboxyl group as condensed with an alcohol forms an ester linkage and with an amine forms an amide linkage.

10. The resinous polymeric composition of claim 9, wherein the predominantly polyethylenically unsaturated alcohol is a mixture of olefinic monohydric alcohols containing about 18 carbon atoms and the secondary reactant is an alcohol.

11. The resinous polymeric composition of claim 9, wherein the predominantly polyethylenically unsaturated alcohol is a mixture of olefinic monohydric alcohols containing about 18 carbon atoms and the secondary reactant is an amine.

12. The resinous polymeric composition of claim 10, wherein the secondary reactant is a mixture of olefinic monohydric alcohols containing about 18 carbon atoms.

13. The resinous polymeric composition of claim 10, wherein the secondary reactant is hydroabietyl alcohol.

14. The resinous polymeric composition of claim 10, wherein the secondary reactant is allyl alcohol.

15. The resinous polymeric composition of claim 11, wherein the secondary reactant is allyl amine.

16. The resinous polymeric composition of claim 11, wherein the secondary reactant is dehydroabietylamine.

17. A coating composition comprising the resinous polymeric composition of claim 9 dissolved in a hydrocarbon solvent.

18. The coating composition of claim 17, wherein the solvent is xylene.

References Cited in the file of this patent

UNITED STATES PATENTS

| | | |
|---|---|---|
| 2,519,764 | Jacobson | Aug. 22, 1950 |
| 2,574,847 | Schertz | Nov. 13, 1951 |
| 2,615,845 | Lippincott et al. | Oct. 28, 1952 |
| 2,625,529 | Hedrick et al. | Jan. 13, 1953 |
| 2,636,015 | Schmultzler | Apr. 21, 1953 |